US012163926B2

(12) United States Patent
Enamito et al.

(10) Patent No.: US 12,163,926 B2
(45) Date of Patent: Dec. 10, 2024

(54) SOUND INSPECTION APPARATUS AND SOUND INSPECTION METHOD

(71) Applicant: KABUSHIKI KAISHA TOSHIBA, Tokyo (JP)

(72) Inventors: Akihiko Enamito, Kawasaki (JP); Tatsuhiko Goto, Kawasaki (JP); Osamu Nishimura, Kawasaki (JP)

(73) Assignee: KABUSHIKI KAISHA TOSHIBA, Tokyo (JP)

(*) Notice: Subject to any disclaimer, the term of this patent is extended or adjusted under 35 U.S.C. 154(b) by 205 days.

(21) Appl. No.: 17/823,666

(22) Filed: Aug. 31, 2022

(65) Prior Publication Data

US 2023/0266277 A1 Aug. 24, 2023

(30) Foreign Application Priority Data

Feb. 18, 2022 (JP) .................................. 2022-024036

(51) Int. Cl.
*G01N 29/44* (2006.01)
*G01N 29/04* (2006.01)
(Continued)

(52) U.S. Cl.
CPC ......... *G01N 29/4436* (2013.01); *G01N 29/04* (2013.01); *G01N 29/043* (2013.01);
(Continued)

(58) Field of Classification Search
CPC .. G01N 29/4436; G01N 29/04; G01N 29/043; G01N 29/11; G01N 29/48;
(Continued)

(56) References Cited

U.S. PATENT DOCUMENTS

| 4,463,453 A | 7/1984 | Cohen et al. |
| 2019/0017973 A1* | 1/2019 | Enamito ................ G01N 29/14 |
| 2022/0150620 A1 | 5/2022 | Enamito et al. |

FOREIGN PATENT DOCUMENTS

| CN | 111504446 | 8/2020 |
| JP | 5-118965 A | 5/1993 |

(Continued)

OTHER PUBLICATIONS

Decision to Grant issued Oct. 8, 2024 in Japanese Patent Application No. 2022-024036, with concise English translation, citing Documents 1 and 15-20 therein.

*Primary Examiner* — Benjamin R Schmitt

(74) *Attorney, Agent, or Firm* — Oblon, McClelland, Maier & Neustadt, L.L.P.

(57) ABSTRACT

A sound inspection apparatus that includes at least three microphones, a removing unit, and an estimation unit. The removing unit calculates an impulse response based on a sound pressure of a radiation sound collected via a reference microphone and a first microphone, calculates an impulse response based on the sound pressure of the radiation sound collected via the reference microphone and a second microphone, and removes a component corresponding to the vibration sound from the calculated impulse response. The intensity calculation unit calculates an intensity of the radiation sound based on the impulse response from which the vibration sound is removed, and the estimation unit estimates, based on the calculated intensity, a site where an abnormality in the inspection target object has occurred.

16 Claims, 13 Drawing Sheets

(51) Int. Cl.
  *G01N 29/11* (2006.01)
  *G01N 29/48* (2006.01)
  *G01N 29/06* (2006.01)
(52) U.S. Cl.
  CPC ............ *G01N 29/11* (2013.01); *G01N 29/48* (2013.01); *G01N 29/069* (2013.01); *G01N 29/4445* (2013.01); *G01N 29/4454* (2013.01); *G01N 2291/023* (2013.01); *G01N 2291/103* (2013.01)
(58) Field of Classification Search
  CPC ............ G01N 29/069; G01N 29/4445; G01N 29/4454; G01N 2291/023; G01N 2291/103
  See application file for complete search history.

(56) References Cited

FOREIGN PATENT DOCUMENTS

| | | | |
|---|---|---|---|
| JP | 2656307 B2 | 9/1997 | |
| JP | H 10-082712 A | 3/1998 | |
| JP | H 11-248591 A | 9/1999 | |
| JP | H 11-270800 A | 10/1999 | |
| JP | 3488579 B2 | 1/2004 | |
| JP | 3571949 B2 | 9/2004 | |
| JP | 2006-047162 A | 2/2006 | |
| JP | 2009-284097 A | 12/2009 | |
| JP | 2012-181100 A | 9/2012 | |
| JP | 2015-219138 A | 12/2015 | |
| JP | 2021-124439 A | 8/2021 | |
| JP | 2022-77684 A | 5/2022 | |
| KR | 20190051672 A | * 5/2019 | ............ G01N 29/06 |

\* cited by examiner

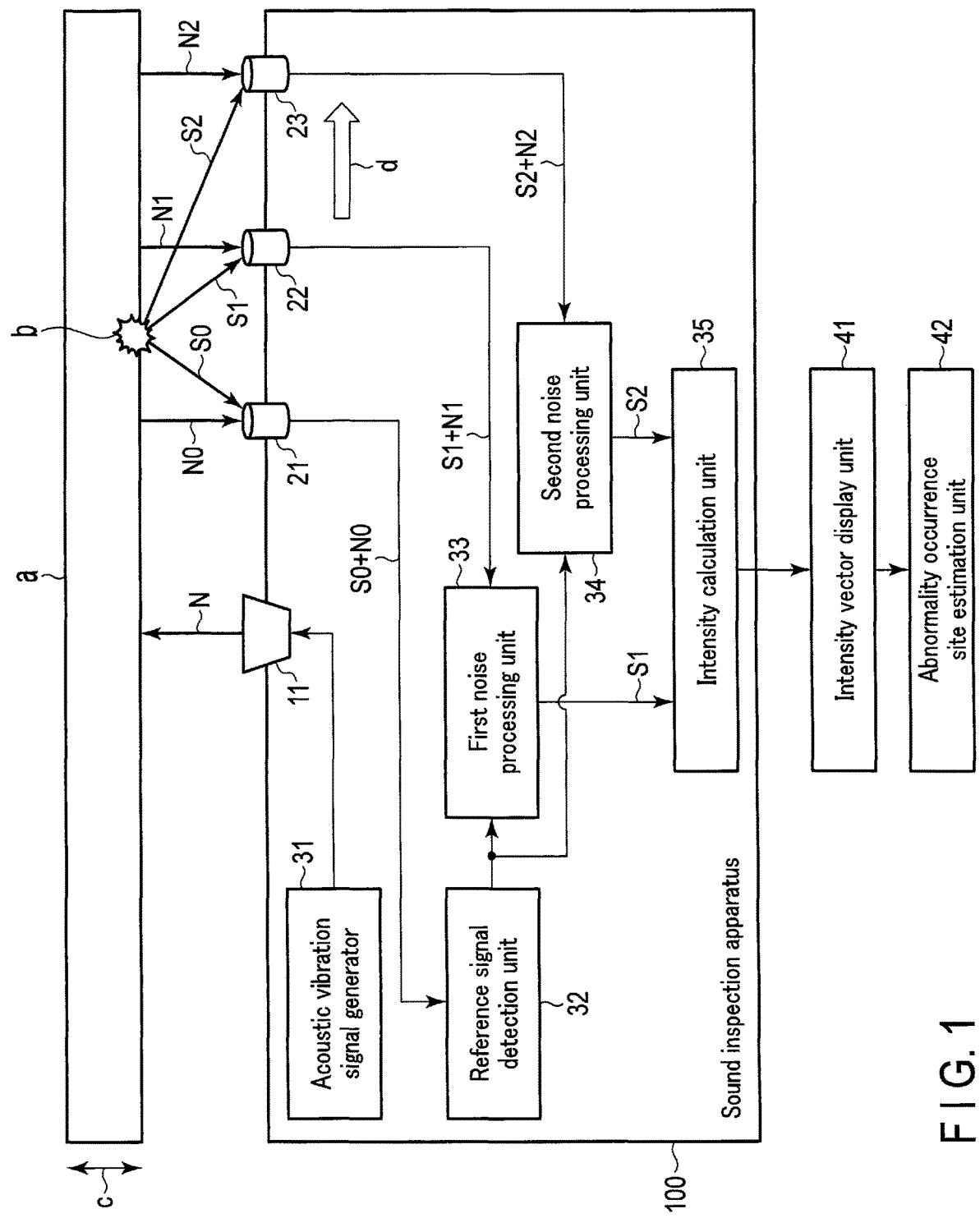
F I G. 1

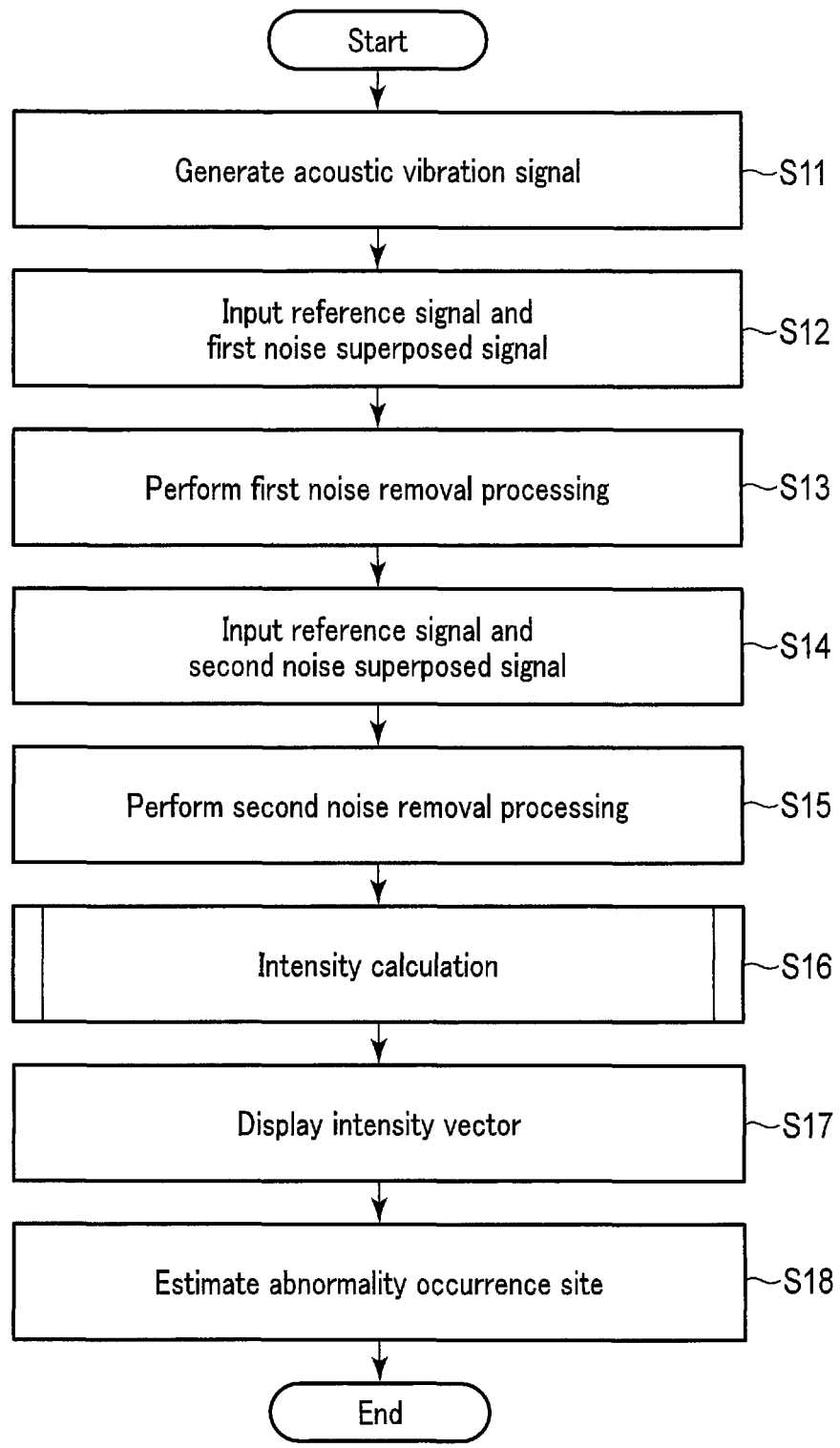
F I G. 2

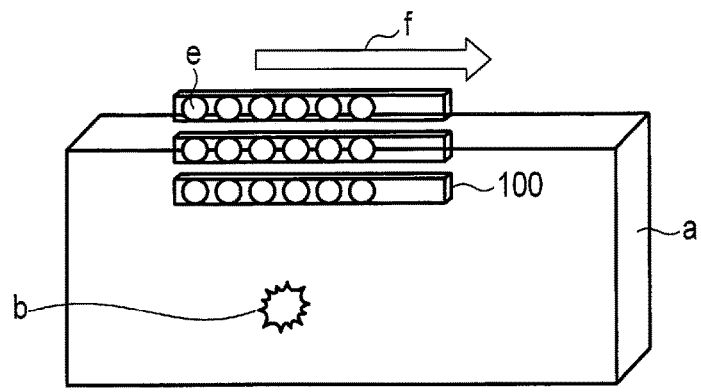
F I G. 9
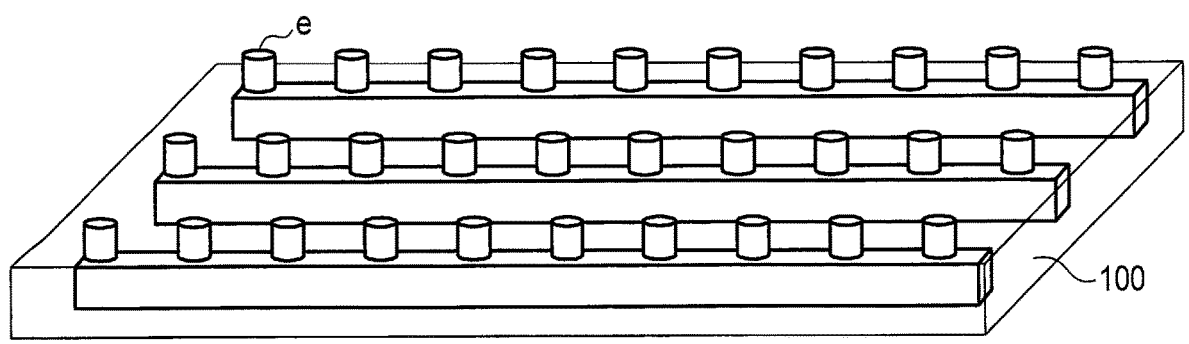
F I G. 10
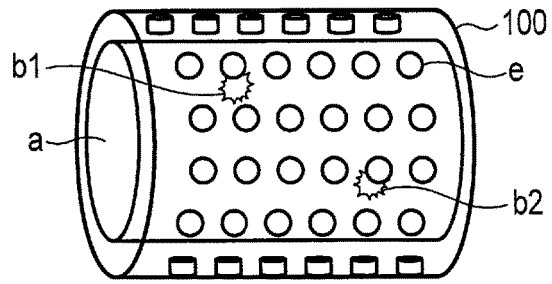
F I G. 11
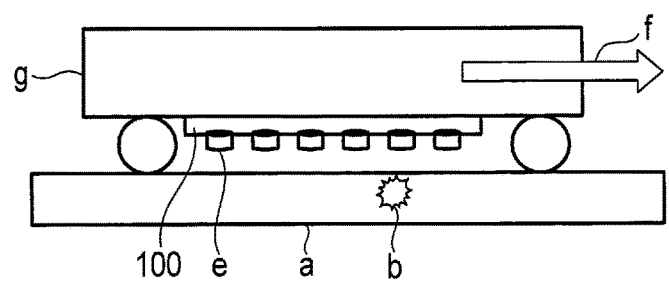
F I G. 12

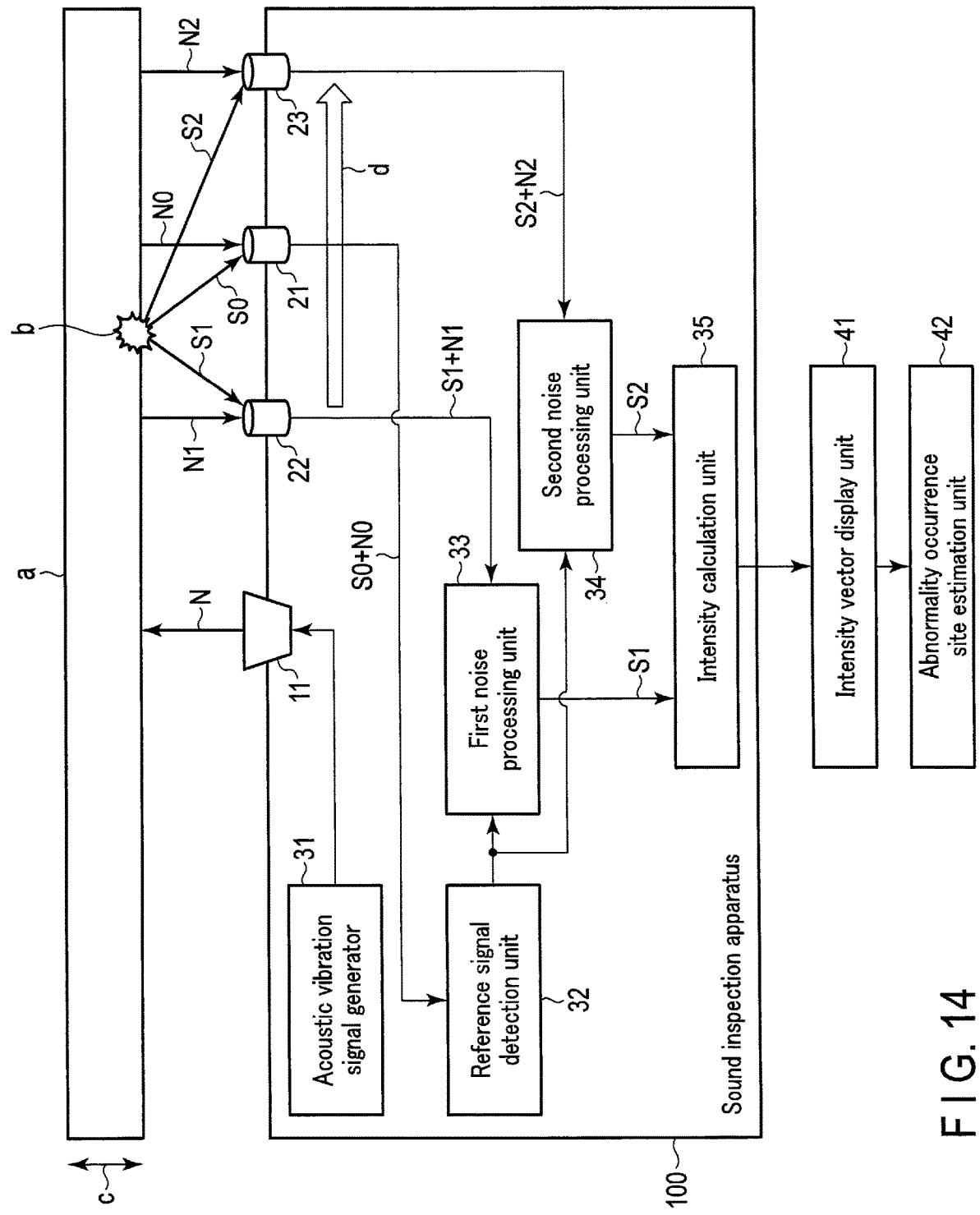
F I G. 14

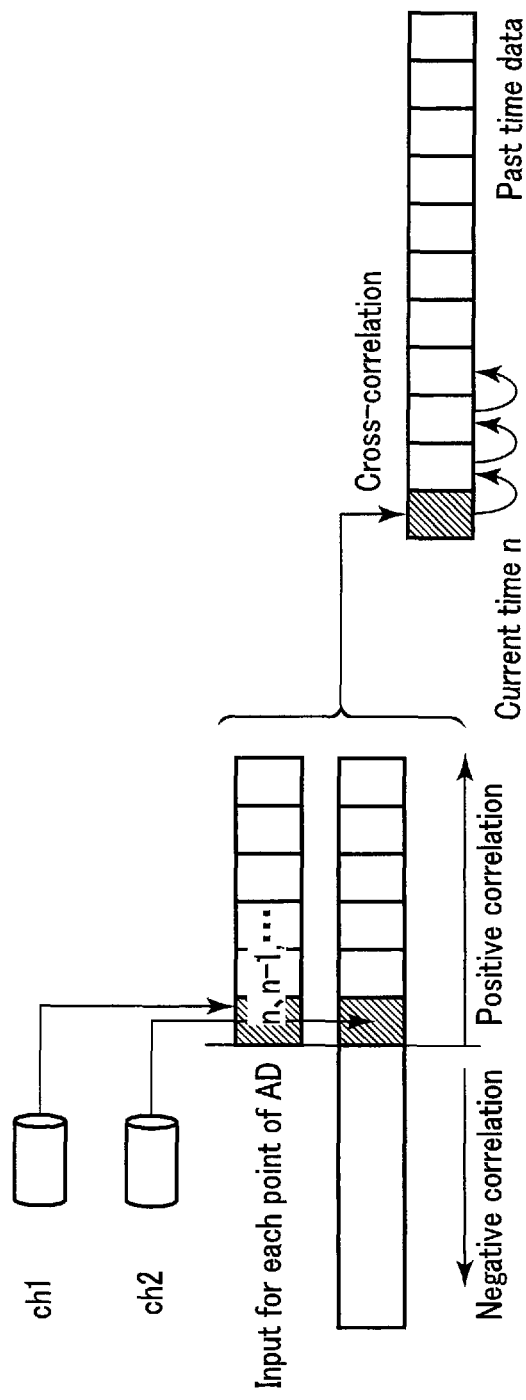
F I G. 18

SOUND INSPECTION APPARATUS AND SOUND INSPECTION METHOD

CROSS-REFERENCE TO RELATED APPLICATION(S)

This application is based upon and claims the benefit of priority from prior Japanese Patent Application No. 2022-024036, filed Feb. 18, 2022, the entire contents of which are incorporated herein by reference.

FIELD

Embodiments described herein relate generally to a sound inspection apparatus and a sound inspection method.

BACKGROUND

There is proposed a technique for nondestructively inspecting an abnormality in an inspection target object using an acoustic wave. In this technique, a vibration sound is radiated to an inspection target object, and a radiation sound from the inspection target object is collected, thereby inspecting an abnormality.

BRIEF DESCRIPTION OF THE DRAWING(S)

FIG. 1 is a block diagram showing an example of the configuration of a sound inspection apparatus according to the first embodiment.

FIG. 2 is a flowchart showing the operation of the sound inspection apparatus according to the first embodiment.

FIG. 9 is a view showing the first example of the application destination of the sound inspection apparatus.

FIG. 10 is a view showing the first example of the application destination of the sound inspection apparatus.

FIG. 11 is a view showing the second example of the application destination of the sound inspection apparatus.

FIG. 12 is a view showing the third example of the application destination of the sound inspection apparatus.

FIG. 14 is a block diagram showing an example of the configuration of a sound inspection apparatus according to the third embodiment.

FIG. 18 is a view for explaining real-time cross-correlation processing.

DETAILED DESCRIPTION

Figure 3:
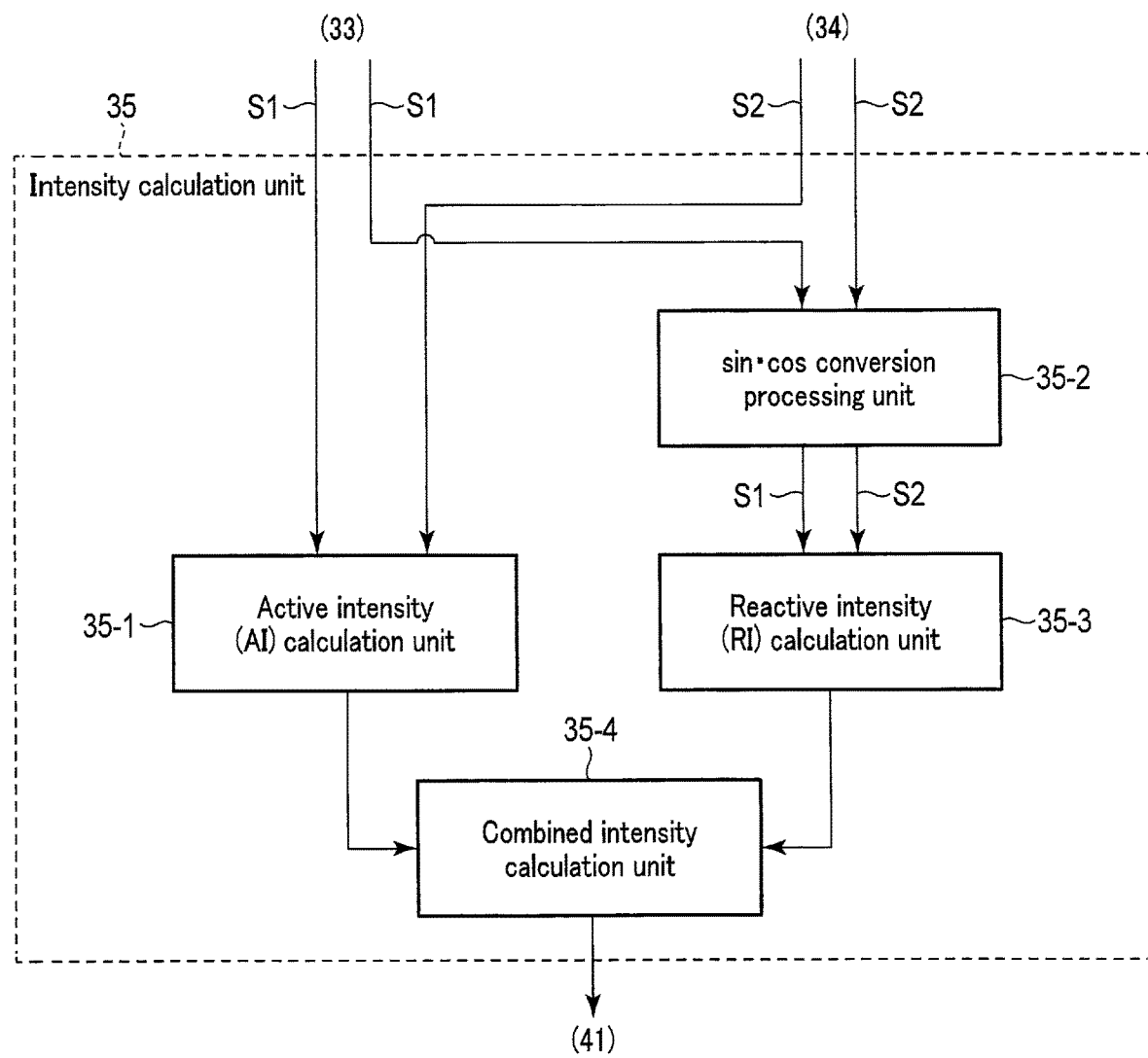
FIG. 3 is a block diagram showing an example of the configuration of the intensity calculation unit of the sound inspection apparatus according to the first embodiment.

In general, according to one embodiment, a sound inspection apparatus includes: a vibration sound source configured to radiate a vibration sound from a speaker to an inspection target object; and at least three microphones arranged at intervals in a direction along a surface of the inspection target object; the apparatus includes: a removing unit configured to, using some microphones of the microphones as reference microphones, calculate an impulse response between the reference microphone and a first microphone different from the reference microphone based on a sound pressure of a radiation sound collected via the reference microphone and a sound pressure of a radiation sound collected via the first microphone, calculate an impulse response between the reference microphone and a second microphone different from the first microphone based on the sound pressure of the radiation sound collected via the reference microphone and a sound pressure of a radiation sound collected via the second microphone, and remove a component corresponding to the vibration sound from the calculated impulse response; an intensity calculation unit configured to calculate an intensity of the radiation sound based on the impulse response from which the vibration sound is removed; and an estimation unit configured to estimate, based on the calculated intensity, a site where an abnormality in the inspection target object has occurred.

In an embodiment, it is possible to accurately inspect an abnormality in an inspection target object using an acoustic wave.

Embodiments will now be described with reference to the accompanying drawings.

First Embodiment

FIG. 1 is a block diagram showing an example of the configuration of a sound inspection apparatus according to the first embodiment.

A speaker 11 and a microphone group are arranged in line and attached to a sound inspection apparatus 100 according to the first embodiment.

Also, the sound inspection apparatus 100 includes an acoustic vibration signal generator 31 serving as a vibration sound source, a reference signal detection unit 32, a first noise processing unit 33, a second noise processing unit 34, and an intensity calculation unit 35. An intensity vector display unit 41 and an abnormality occurrence site estimation unit 42 are provided outside the sound inspection apparatus 100. The intensity vector display unit 41 and the abnormality occurrence site estimation unit 42 may be provided in the sound inspection apparatus 100.

The reference signal detection unit 32, the first noise processing unit 33, the second noise processing unit 34, and the intensity calculation unit 35 are sometimes referred to as processing units in the sound inspection apparatus 100. If the intensity vector display unit 41 and the abnormality occurrence site estimation unit 42 are provide in the sound inspection apparatus 100, these can be included in the processing units in the sound inspection apparatus 100.

Each processing unit of the sound inspection apparatus 100 includes a digital signal processing device such as a CPU (Central Processing Unit), an ASIC (Application Specific Integrated Circuit), an FPGA (Field-Programmable Gate Array), or a DSP (Digital Signal Processor), and performs various kinds of processing associated with the sound inspection apparatus 100.

Each processing unit of the sound inspection apparatus 100 may be formed by a single CPU or a plurality of CPUs. The processing units of the sound inspection apparatus 100 execute a sound inspection program stored in, for example, a memory (not shown) in the sound inspection apparatus 100, thereby operating as, for example, the reference signal detection unit 32, the first noise processing unit 33, the second noise processing unit 34, and the intensity calculation unit 35 described above.

The memory includes, for example, a ROM (Read Only Memory) and a RAM (Random Access Memory). Various kinds of programs such as an activation program for the sound inspection apparatus and the sound inspection program to be executed by the processing units are stored in the ROM. The RAM can be used as a work memory in various kinds of operations by the processing units.

In a state in which the speaker 11 and the microphone group are arranged facing an inspection target object a, the sound inspection apparatus 100 radiates a vibration sound to the inspection target object a, and collects, by the microphone group, a radiation sound from a portion of the inspection target object a near the microphone group of the sound inspection apparatus 100. The sound inspection apparatus 100 thus inspects the presence/absence of an abnormality in an inspection target object a. The abnormality in the inspection target object a is, for example, a crack b generated in the inspection target object a.

The acoustic vibration signal generator 31 is a sound source that generates an acoustic vibration signal used to generate a vibration sound to be radiated to the inspection target object a. The vibration sound may be, for example, one hammering sound. The acoustic vibration signal may be generated by an arbitrary method.

The speaker 11 is arranged facing the inspection target object a, and radiates a vibration sound to the inspection target object a in accordance with an acoustic vibration signal input from the acoustic vibration signal generator 31.

By the vibration sound, the inspection target object a vibrates in a direction c along the vibration sound propagation direction as a whole, and a radiation sound is radiated from the inspection target object a along with the vibration.

The microphone group includes at least three microphones arranged at intervals along the direction orthogonal to the vibration sound radiation direction. In the example shown in FIG. 1, the microphone group includes a first microphone 21, a second microphone 22, and a third microphone 23.

In the first embodiment, the first microphone 21 is a reference microphone that is arranged at an interval to the speaker 11 and at a position, for example, 2.5 cm apart from the inspection target object a so as to face a neighborhood of the inspection target object a.

The second microphone 22 is a microphone that is arranged at an interval to the first microphone 21 and at a larger interval to the speaker 11 than the first microphone 21 so as to face a neighborhood of the inspection target object a.

The third microphone 23 is a microphone that is arranged at a larger interval to the speaker 11 and the first microphone 21 than the second microphone 22. That is, the second microphone 22 and the third microphone 23 are microphones that are arranged at different intervals to the first microphone 21 along the direction orthogonal to the vibration sound radiation direction.

As described above, in the first embodiment, to the speaker 11, the microphones are arranged at intervals to each other in the order of the first microphone 21, the second microphone 22, and the third microphone 23.

The first microphone 21, the second microphone 22, and the third microphone 23 each collect the radiation sound from the inspection target object a, convert the collected radiation sound into an electrical signal, and output it to the units of the sound inspection apparatus 100.

More specifically, the first microphone 21 collects a weak vibration component S0 and noise (acoustic vibration wave) N0 from the inspection target object a, converts the collected result into an electrical signal, and outputs it to the reference signal detection unit 32. The reference signal detection unit 32 detects the signal output from the first microphone 21 as a reference signal that is an acoustic signal for reference, and outputs the reference signal to the first noise processing unit 33 and the second noise processing unit 34. The microphone associated with the output of the reference signal is sometimes called a reference microphone.

The second microphone 22 collects a weak vibration component S1 and noise N1 from the inspection target object a, converts the collected result into an electrical signal, and outputs it to the first noise processing unit 33.

The third microphone 23 collects a weak vibration component S2 and noise N2 from the inspection target object a, converts the collected result into an electrical signal, and outputs it to the second noise processing unit 34.

The first noise processing unit 33 receives the reference signal from the reference signal detection unit 32, and also receives the signal from the second microphone 22 as a first noise superposed signal that is an acoustic signal.

The first noise processing unit 33 samples each of the received reference signal and the first noise superposed signal in accordance with a sampling frequency, and performs analog/digital (AD) conversion, thereby obtaining digital inspection data.

The first noise processing unit 33 performs digital operation processing based on a first sound pressure (digital data) based on the sampling result of the reference signal and a second sound pressure (digital data) based on the sampling result of the first noise superposed signal, and calculates an impulse response between the first microphone 21 and the second microphone 22.

For example, the first noise processing unit 33 calculates the impulse response by adaptive identification processing using a convolutional operation. The first noise processing unit 33 can also calculate the impulse response using cross-correlation processing. If the cross-correlation processing is used in the configuration shown in FIG. 1, the first noise processing unit 33 can calculate the impulse response using positive cross-correlation processing.

The first noise processing unit 33 performs first noise removal processing of removing the noise components N0 and N1 of the calculated impulse response and extracting the weak vibration components S0 and S1 generated along with the vibration of the peripheral portion of the crack b in the inspection target object a, and outputs the weak vibration component S1 to the intensity calculation unit 35.

The calculated impulse response includes the component of the vibration sound and the weak vibration component.

For this reason, a frequency characteristic calculated based on the impulse response also includes both the frequency characteristic of the vibration sound and the frequency characteristic of the weak vibration component.

The weak vibration component generated along with the vibration of the peripheral portion of the crack b in the inspection target object a is weak as compared to the vibration sound.

That is, the vibration sound is necessary for exciting the weak vibration component but is unnecessary noise for determination of the abnormality in the inspection target object a.

Hence, the first noise processing unit 33 removes the component of the vibration sound that is noise.

Here, the vibration sound collected by the first microphone 21 and the second microphone 22 can include the component of a direct wave from the speaker 11 and the component of a reflected wave from the inspection target object a.

The component of the direct wave can be removed by setting of the first microphone 21 or adaptive identification processing.

On the other hand, the component of the reflected wave from the inspection target object a can be removed by, for example, detecting the maximum peak of the impulse response and removing a component of the impulse response in a predetermined time width including the maximum peak, that is, a component of sampling points corresponding to the time width.

The first noise processing unit 33 performs such processing of removing the component of the impulse response in the predetermined time width including the maximum peak.

The reverberation of the weak vibration component is longer as compared to the vibration sound (the direct wave and the reflected wave).

Hence, if the component of the impulse response in the predetermined time width is removed, the frequency characteristic calculated based on the impulse response includes only the frequency characteristic of the weak vibration component.

Since a difference occurs in the frequency characteristic of the weak vibration component between a case where an abnormality exists in the inspection target object a and a case where not, the presence/absence of an abnormality can be determined based on the difference.

In addition, the second noise processing unit 34 receives the reference signal from the reference signal detection unit 32, and also receives the signal from the third microphone 23 as a second noise superposed signal that is an acoustic signal.

The second noise processing unit 34 samples each of the received reference signal and the second noise superposed signal in accordance with a sampling frequency, and performs analog/digital (AD) conversion, thereby obtaining digital inspection data.

The second noise processing unit 34 performs digital operation processing based on a first sound pressure (digital data) based on the sampling result of the reference signal and a second sound pressure (digital data) based on the sampling result of the second noise superposed signal, and calculates an impulse response between the first microphone 21 and the third microphone 23.

For example, the second noise processing unit 34 calculates the impulse response by adaptive identification processing using a convolutional operation. The second noise processing unit 34 can also calculate the impulse response using cross-correlation processing. If the cross-correlation processing is used in the configuration shown in FIG. 1, the second noise processing unit 34 can calculate the impulse response using positive cross-correlation processing.

The second noise processing unit 34 performs second noise removal processing of removing the noise components N0 and N2 of the calculated impulse response and extracting the weak vibration components S0 and S2 generated along with the vibration of the peripheral portion of the crack b in the inspection target object a, and outputs the weak vibration component S2 to the intensity calculation unit 35.

The intensity calculation unit 35 calculates an intensity based on the weak vibration component S1 output from the first noise processing unit 33 and the weak vibration component S2 output from the second noise processing unit 34. Details of the calculation will be described later.

FIG. 2 is a flowchart showing the operation of the sound inspection apparatus according to the first embodiment.

The acoustic vibration signal generator 31 of the sound inspection apparatus 100 generates an acoustic vibration signal used to generate a vibration sound to be radiated to the inspection target object a (step S11).

The first noise processing unit 33 receives the reference signal from the reference signal detection unit 32 and the first noise superposed signal from the second microphone 22 (step S12).

The first noise processing unit 33 calculates the impulse response between the first microphone 21 and the second microphone 22 based on the reference signal and the first noise superposed signal. The first noise processing unit 33 performs first noise removal processing of removing the noise components N0 and N1 of the calculated impulse response and extracting the weak vibration components S0 and S1 (step S13).

The second noise processing unit 34 receives the reference signal from the reference signal detection unit 32 and the second noise superposed signal from the third microphone 23 (step S14).

The second noise processing unit 34 calculates the impulse response between the first microphone 21 and the third microphone 23 based on the reference signal and the second noise superposed signal. The second noise processing unit 34 performs second noise removal processing of removing the noise components N0 and N2 of the calculated impulse response and extracting the weak vibration components S0 and S2 (step S15).

The intensity calculation unit 35 calculates an intensity based on the weak vibration component S1 output from the first noise processing unit 33 and the weak vibration component S2 output from the second noise processing unit 34 (step S16).

FIG. 3 is a block diagram showing an example of the functional configuration of the intensity calculation unit.

As shown in FIG. 3, the intensity calculation unit 35 includes an active intensity (AI) calculation unit 35-1, a sin·cos conversion processing unit 35-2, a reactive intensity (RI) calculation unit 35-3, and a combined intensity calculation unit 35-4.

Figure 4:
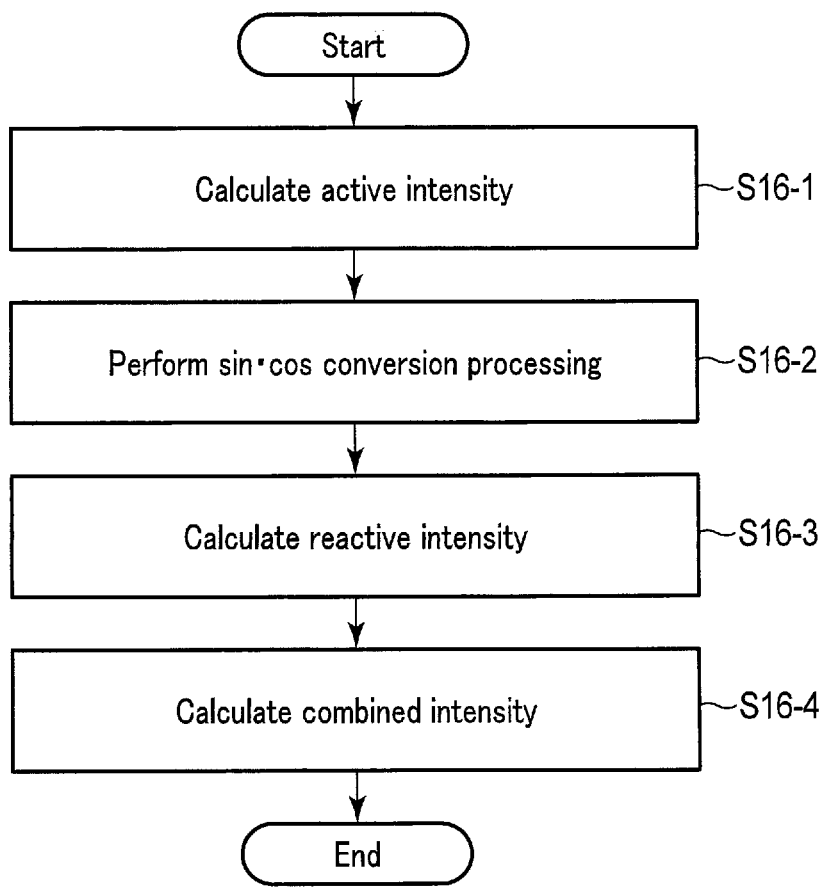
FIG. 4 is a flowchart showing the operation of the intensity calculation unit of the sound inspection apparatus according to the first embodiment.

FIG. 4 is a flowchart showing the operation of the intensity calculation unit of the sound inspection apparatus according to the first embodiment.

The active intensity calculation unit 35-1 calculates an active intensity based on the weak vibration component S1 output from the first noise processing unit 33 and the weak vibration component S2 output from the second noise processing unit 34 (step S16-1).

The sin·cos conversion processing unit 35-2 performs sin·cos conversion processing for the weak vibration component S1 output from the first noise processing unit 33 and the weak vibration component S2 output from the second noise processing unit 34. Thus, the sin·cos conversion processing unit 35-2 delays the phase of one of the weak vibration component S1 and the weak vibration component S2 by 90° (step S16-2).

The reactive intensity calculation unit 35-3 calculates a reactive intensity based on the weak vibration component S1 and the weak vibration component S2 output from the sin·cos conversion processing unit 35-2 (step S16-3).

The combined intensity calculation unit 35-4 calculates a combined intensity that is an intensity vector between the second microphone 22 and the third microphone 23 (reference symbol d in FIG. 1) based on the polarity of the active intensity from the active intensity calculation unit 35-1 and the amplitude of the reactive intensity from the reactive intensity calculation unit 35-3. The combined intensity calculation unit 35-4 outputs the combined intensity to the intensity vector display unit 41 (step S16-4).

Figure 5:
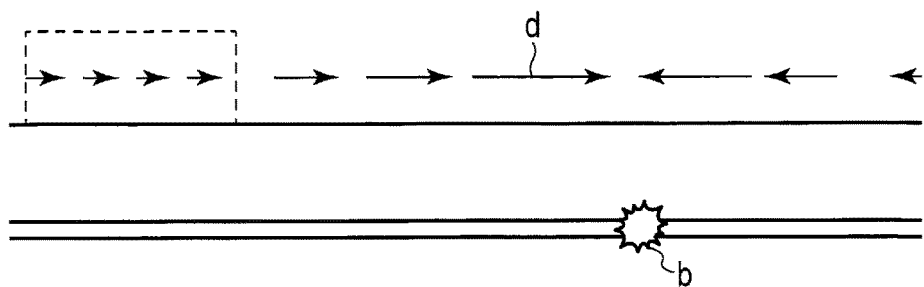
FIG. 5 is a view showing an example of an intensity.

FIG. 5 is a view showing an example of the intensity.

As shown in FIG. 5, the intensity vector (reference symbol d in FIG. 5) becomes large as it comes close to an abnormality occurrence position (reference symbol b in FIG. 5) of the inspection target object a, and becomes maximum immediately above the position. From this point, the polarity is inverted, and the intensity vector becomes small as it separates from the abnormality occurrence position.

This is an ideal intensity detection result. An embodiment in which intensity measurement is executed using a microphone group along a wall will be described below.

Figure 6:
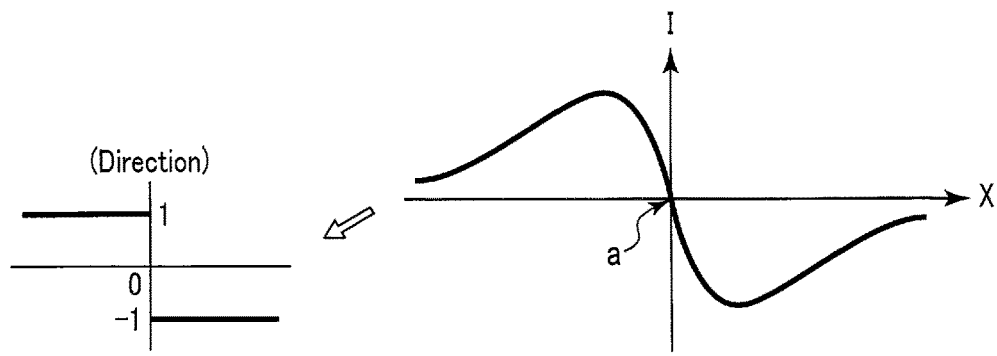
FIG. 6 is a view showing an example of the characteristic of an active intensity.

An example of the characteristic of a normal intensity, that is, an active intensity is shown in FIG. 6.

The active intensity calculated by the active intensity calculation unit 35-1 becomes maximum at a position far apart to some extent from the abnormality occurrence position of the inspection target object, and decreases as it comes close to the point (reference symbol a in FIG. 6) immediately above the abnormality occurrence position. Immediately above the abnormality occurrence position, the active intensity becomes zero, and its polarity is inverted. The active intensity then becomes minimum at a position far apart to some extent from the abnormality occurrence position, that is, maximum in the reverse phase.

As described above, if the amplitude of the intensity is minimum at the abnormality occurrence position where the energy should originally be highest, accurate measurement cannot be performed. At a position apart from the abnormality occurrence position a little, the amplitude of the active intensity is maximum. In an inspection target object that exhibits weak vibration as in this embodiment, however, at a position apart from the abnormality occurrence position, amplitude reduction caused by attenuation due to the distance is undeniable.

Figure 7:
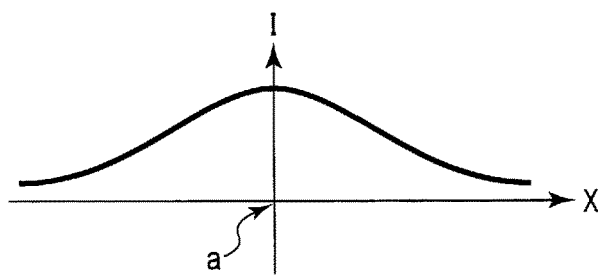
FIG. 7 is a view showing an example of the characteristic of a reactive intensity.

Hence, in this embodiment, the characteristic of the reactive intensity is also used. FIG. 7 is a view showing an example of the characteristic of the reactive intensity.

As shown in FIG. 7, the reactive intensity calculated by the reactive intensity calculation unit 35-3 increases as it comes close to the point immediately above the abnormality occurrence position (reference symbol a in FIG. 7), becomes maximum immediately above the abnormality occurrence position, and decreases in the same phase as it separates from the abnormality occurrence position.

In this embodiment, the above-described problem is solved by calculating an intensity that combines the characteristic of the reactive intensity whose amplitude is maximum immediately above the abnormality occurrence position and the characteristic of the active intensity whose polarity is inverted immediately above the abnormality occurrence position.

Figure 8:
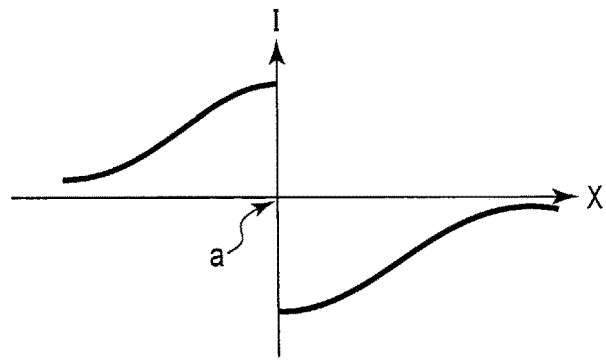
FIG. 8 is a view showing an example of the characteristic of a combined intensity.

FIG. 8 is a view showing an example of the characteristic of the combined intensity.

As shown in FIG. 8, the combined intensity calculated by the combined intensity calculation unit 35-4 becomes minimum at a position far apart to some extent from the abnormality occurrence position of the inspection target object, and increases as it comes close to the point immediately above the abnormality occurrence position (reference symbol a in FIG. 8). Immediately above the abnormality occurrence position, the combined intensity is maximum, and the polarity is inverted. The combined intensity decreases as it separates from the abnormality occurrence position, that is, increases in the reverse phase.

After step S16 described above, the intensity vector display unit 41 displays, on a display device (not shown), a one-dimensional intensity distribution that shows the gain and polarity of the intensity with respect to a position based on the combined intensity from the combined intensity calculation unit 35-4, and outputs the one-dimensional intensity distribution to the abnormality occurrence site estimation unit 42 (step S17).

The abnormality occurrence site estimation unit 42 measures a vector field indicated by the one-dimensional intensity distribution, in which the gain is maximum, and the polarity is inverted, thereby estimating the abnormality occurrence site (step S18).

In the embodiment, a plurality of sets of inspection acoustic devices, each of which is formed by the speaker 11 and the microphone group, may be provided in the sound inspection apparatus 100 to inspect the presence/absence of an abnormality in a wide area of the inspection target object a.

Alternatively, one set or a small number of sets of inspection acoustic devices may be provided in the sound inspection apparatus 100, and the sound inspection apparatus 100 itself may be moved to be scanned by the inspection target object a to sequentially inspect the presence/absence of an abnormality in each area of the inspection target object a.

FIGS. 9 and 10 are views showing the first example of the application destination of the sound inspection apparatus.

In the example shown in FIGS. 9 and 10, a plurality of inspection acoustic devices (reference symbol e in FIGS. 9 and 10) are attached to the sound inspection apparatus 100 (FIG. 10). The microphone groups are moved along the longitudinal direction (reference symbol f in FIG. 9) of the inspection target object a, thereby sequentially inspecting the presence/absence of an abnormality occurrence position (reference symbol b in FIG. 9) in each area of the inspection target object a.

FIG. 11 is a view showing the second example of the application destination of the sound inspection apparatus.

As in the example shown in FIG. 11, the sound inspection apparatus 100 is configured as an apparatus with the inspection acoustic devices (reference symbol e in FIG. 11) attached to the inner peripheral surface of a cylindrical member including a hollow portion. If the inspection target object a is a cylindrical member, the inspection target object a is arranged to be inserted into the hollow portion of the sound inspection apparatus 100 such that the inspection acoustic devices cover the outer peripheral surface of the inspection target object a, thereby inspecting abnormality occurrence positions (reference symbols b1 and b2 in FIG. 11) of the inspection target object a.

FIG. 12 is a view showing the third example of the application destination of the sound inspection apparatus.

As in the example shown in FIG. 12, the sound inspection apparatus 100 is configured as an apparatus mounted on the bottom surface side of a vehicle (reference symbol g in FIG. 12) and including the attached inspection acoustic devices (reference symbol e in FIG. 12). The vehicle is moved along the longitudinal direction (reference symbol f in FIG. 12) of the inspection target object a, thereby sequentially inspecting the presence/absence of an abnormality in each area of the inspection target object a.

As described above, in the first embodiment, the speaker and the first to third microphones are made to face the inspection target object, a vibration sound is radiated from the speaker 11 to the inspection target object, an intensity vector based on the intensity based on the reference signal from the first microphone and the noise superposed signal from the second microphone and the intensity based on the reference signal from the first microphone and the noise superposed signal from the third microphone is calculated, and an abnormality occurrence position in the inspection target object is estimated based on the intensity vector. This makes it possible to accurately inspect an abnormality of the inspection target object using an acoustic wave.

Second Embodiment

The second embodiment will be described next. In the following embodiments, a detailed description of the same components as in the first embodiment will be omitted.

Figure 13:
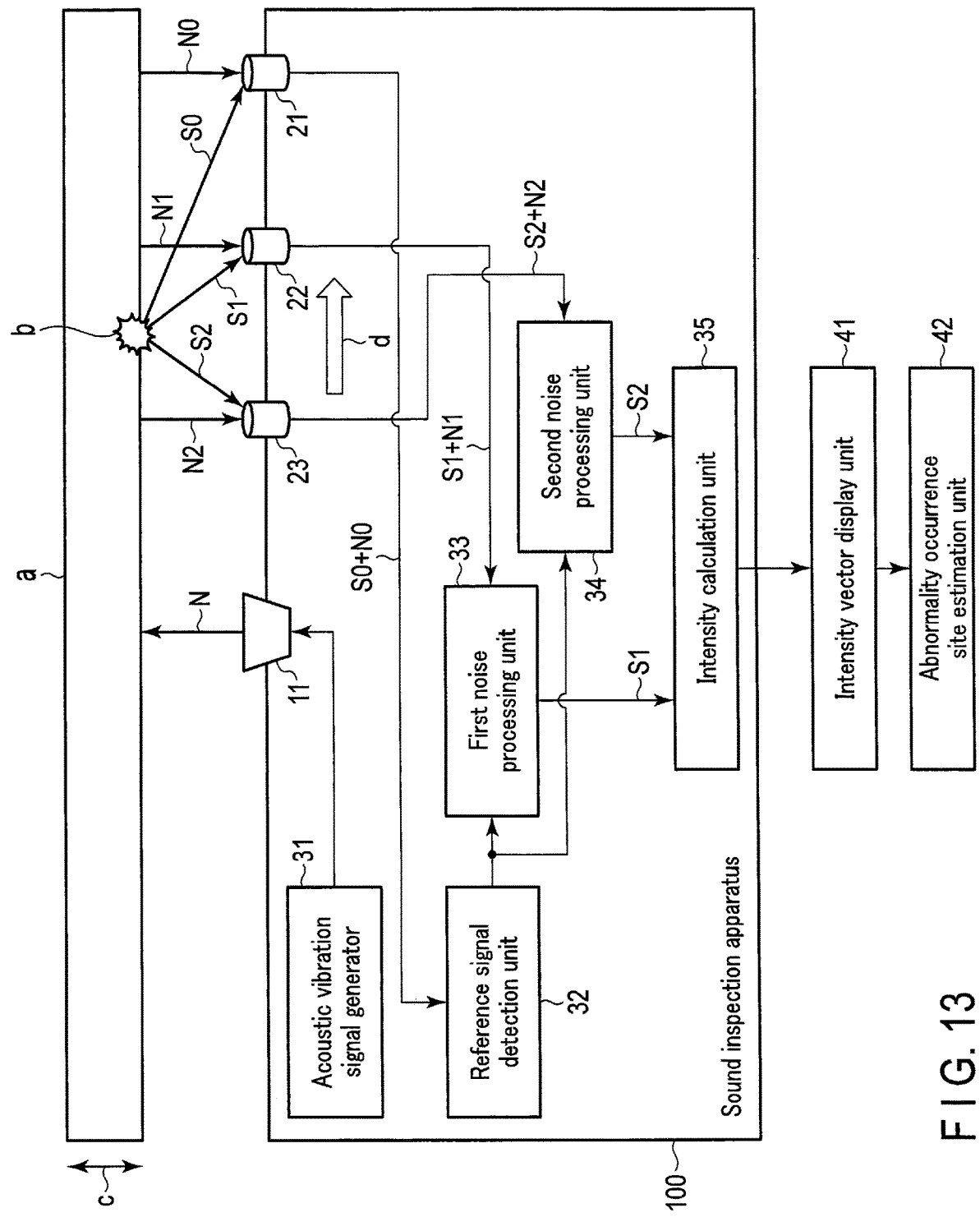
FIG. 13 is a block diagram showing an example of the configuration of a sound inspection apparatus according to the second embodiment.

FIG. 13 is a block diagram showing an example of the configuration of a sound inspection apparatus according to the second embodiment.

As shown in FIG. 13, in the second embodiment, the arrangement of a first microphone 21, a second microphone 22, and a third microphone 23 is different, as compared to the first embodiment.

More specifically, in the second embodiment, viewed from a speaker 11, the microphones are arranged at intervals to each other in the order of the third microphone 23, the second microphone 22, and the first microphone 21. The input/output relationship between the microphones and processing units is the same as in the first embodiment.

In the configuration shown in FIG. 13, a first noise processing unit 33 and a second noise processing unit 34 can calculate an impulse response using negative cross-correlation processing.

In the configuration shown in FIG. 13, a combined intensity that is an intensity vector between the second microphone 22 and the third microphone 23, which is calculated by an intensity calculation unit 35, corresponds to reference symbol d in FIG. 13, and its position is changed to a position close to the speaker 11, as compared to the combined intensity shown in FIG. 1.

As described above, in the second embodiment, since the arrangement of the microphones is changed, as compared to the first embodiment, the position of the intensity vector can be changed.

Third Embodiment

FIG. 14 is a block diagram showing an example of the configuration of a sound inspection apparatus according to the third embodiment.

As shown in FIG. 14, in the third embodiment, the arrangement of a first microphone 21, a second microphone 22, and a third microphone 23 is different, as compared to the first and second embodiments.

More specifically, in the third embodiment, viewed from a speaker 11, the microphones are arranged at intervals to each other in the order of the second microphone 22, the first microphone 21, and the third microphone 23. Hence, in the third embodiment, the interval between the second microphone 22 and the third microphone 23 is wider as compared to the first and second embodiments. The input/output relationship between the microphones and processing units is the same as in the first and second embodiments.

In the configuration shown in FIG. 14, a first noise processing unit 33 can calculate an impulse response using negative cross-correlation processing, and a second noise processing unit 34 can calculate an impulse response using positive cross-correlation processing.

In the configuration shown in FIG. 14, a combined intensity that is an intensity vector between the second microphone 22 and the third microphone 23, which is calculated by an intensity calculation unit 35, corresponds to reference symbol d in FIG. 14, and its range is extended, as compared to the combined intensity shown in FIG. 1.

As described above, in the third embodiment, since the arrangement of the microphones is changed, and the range of the intensity vector can thus be extended, as compared to the first embodiment, the intensity vector detection accuracy according to, for example, a target frequency can be changed.

Fourth Embodiment

Figure 15:
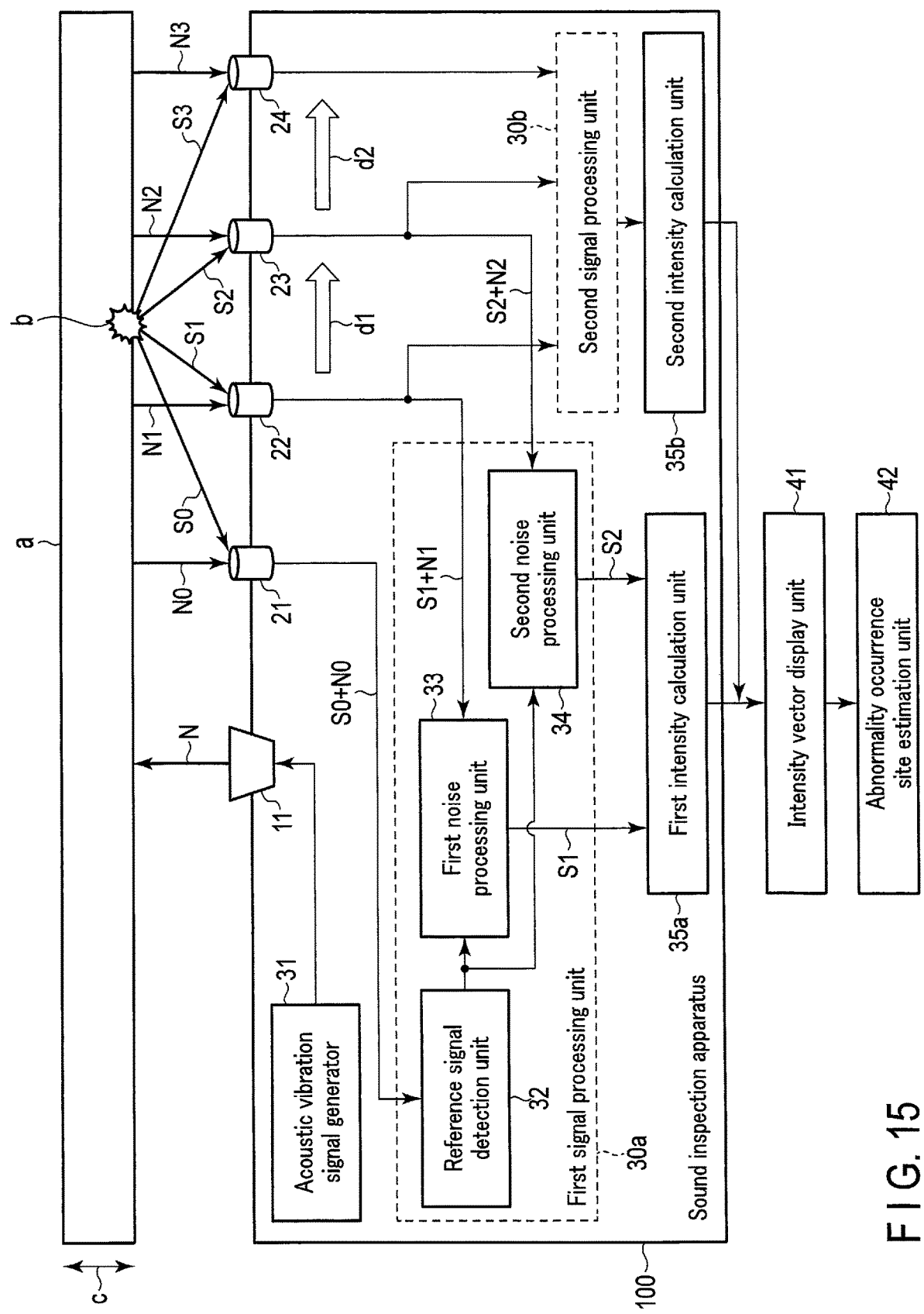
FIG. 15 is a block diagram showing an example of the configuration of a sound inspection apparatus according to the fourth embodiment.

FIG. 15 is a block diagram showing an example of the configuration of a sound inspection apparatus according to the fourth embodiment.

As shown in FIG. 15, in the fourth embodiment, in addition to a first microphone 21, a second microphone 22, and a third microphone 23 described in the first to third embodiments, a fourth microphone 24 is further attached to a sound inspection apparatus 100.

In this example, the positional relationship and the intervals between a speaker 11, the first microphone 21, the second microphone 22, and the third microphone 23 are the same as in the first embodiment. The fourth microphone 24 is a microphone arranged at intervals wider than the third microphone 23 to the speaker 11 and the first microphone 21. That is, in the fourth embodiment, with respect to the speaker 11, the microphones are arranged at intervals to each other in the order of the first microphone 21, the second microphone 22, the third microphone 23, and the fourth microphone 24.

Also, in the fourth embodiment, the processing units of the sound inspection apparatus 100 include two signal processing units including a reference signal detection unit 32, a first noise processing unit 33, and a second noise processing unit 34 described in the first embodiment.

In the example shown in FIG. 15, the sound inspection apparatus 100 is provided with a first signal processing unit 30a and a second signal processing unit 30b. The first signal processing unit 30a and the second signal processing unit 30b each have the reference signal detection unit 32, the first noise processing unit 33, and the second noise processing unit 34.

Also, the sound inspection apparatus 100 is provided with a first intensity calculation unit 35a and a second intensity calculation unit 35b in place of the intensity calculation unit 35 described in the first embodiment.

Figure 16:
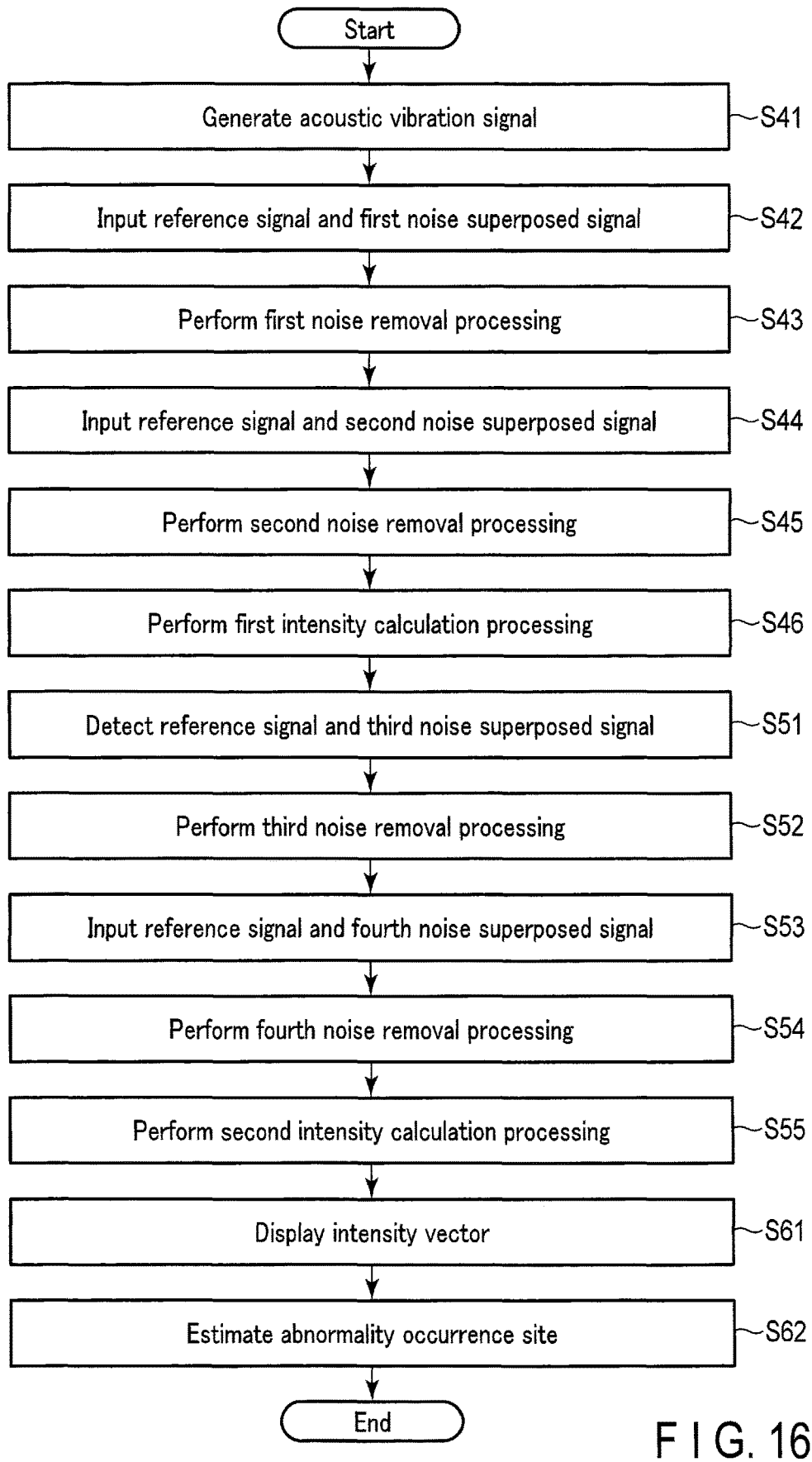
FIG. 16 is a flowchart showing the operation of the intensity calculation units of the sound inspection apparatus according to the fourth embodiment.

FIG. 16 is a flowchart showing the operation of the intensity calculation units of the sound inspection apparatus according to the fourth embodiment.

An acoustic vibration signal generator 31 of the sound inspection apparatus 100 generates an acoustic vibration signal used to generate a vibration sound to be radiated to an inspection target object a (step S41).

The reference signal detection unit 32 of the first signal processing unit 30a detects a signal output from the first microphone 21 as a reference signal that is an acoustic signal for reference, and outputs the reference signal to the first noise processing unit 33 and the second noise processing unit 34 of the first signal processing unit 30a.

The first noise processing unit 33 of the first signal processing unit 30a receives the reference signal from the reference signal detection unit 32 of the first signal processing unit 30a and a first noise superposed signal from the second microphone 22 (step S42).

The first noise processing unit 33 of the first signal processing unit 30a calculates an impulse response between the first microphone 21 and the second microphone 22 based on the reference signal and the first noise superposed signal. The first noise processing unit 33 performs first noise removal processing of removing noise components N0 and N1 of the calculated impulse response and extracting weak vibration components S0 and S1 (step S43).

The second noise processing unit 34 of the first signal processing unit 30a receives the reference signal from the reference signal detection unit 32 of the first signal processing unit 30a and a second noise superposed signal from the third microphone 23 (step S44).

The second noise processing unit 34 of the first signal processing unit 30a calculates an impulse response between the first microphone 21 and the third microphone 23 based on the reference signal and the second noise superposed signal. The second noise processing unit 34 performs second noise removal processing of removing the noise components N0 and N2 of the calculated impulse response and extracting the weak vibration components S0 and S2 (step S45).

The first intensity calculation unit 35a performs first intensity calculation processing of calculating a combined intensity that is an intensity vector (reference symbol d1 in FIG. 15) between the second microphone 22 and the third microphone 23 based on the weak vibration component S1 output from the first noise processing unit 33 of the first signal processing unit 30a and the weak vibration component S2 output from the second noise processing unit 34 of the first signal processing unit 30a (step S46).

Also, the reference signal detection unit 32 of the second signal processing unit 30b detects a signal output from the second microphone 22 as a reference signal that is an acoustic signal for reference, and outputs the reference signal to the first noise processing unit 33 and the second noise processing unit 34 of the second signal processing unit 30b.

Thus, in the fourth embodiment, the microphone as the reference signal detection source changes between the first signal processing unit 30a and the second signal processing unit 30b. In other words, in the fourth embodiment, the second microphone 22 serves, for the first signal processing unit 30a, as a reference microphone concerning output of the reference signal, and serves, for the second signal processing unit 30b, as the output source of the signal concerning calculation of the intensity vector.

The first noise processing unit 33 of the second signal processing unit 30b receives the reference signal from the reference signal detection unit 32 of the second signal processing unit 30b and a third noise superposed signal from the third microphone 23 (step S51).

The first noise processing unit 33 of the second signal processing unit 30b calculates an impulse response between the first microphone 21 and the third microphone 23 based on the reference signal and the third noise superposed signal. The first noise processing unit 33 performs third noise removal processing of removing the noise components N0 and N2 of the calculated impulse response and extracting the weak vibration components S0 and S2 (step S52).

The second noise processing unit 34 of the second signal processing unit 30b receives the reference signal from the reference signal detection unit 32 of the second signal processing unit 30b and a fourth noise superposed signal from the fourth microphone 24 (step S53).

The second noise processing unit 34 of the second signal processing unit 30b calculates an impulse response between the first microphone 21 and the fourth microphone 24 based on the reference signal and the fourth noise superposed signal. The second noise processing unit 34 performs fourth noise removal processing of removing the noise components N0 and N3 of the calculated impulse response and extracting the weak vibration components S0 and S3 (step S54).

The second intensity calculation unit 35b performs second intensity calculation processing of calculating a combined intensity that is an intensity vector (reference symbol d2 in FIG. 15) between the third microphone 23 and the fourth microphone 24 based on the weak vibration component S2 output from the first noise processing unit 33 of the second signal processing unit 30b and the weak vibration component S3 output from the second noise processing unit 34 of the second signal processing unit 30b (step S55).

After step S55 described above, an intensity vector display unit 41 displays, on a display device, a one-dimensional intensity distribution based on the combined intensity from the first intensity calculation unit 35a and the combined intensity from the second intensity calculation unit 35b, and outputs the one-dimensional intensity distribution to an abnormality occurrence site estimation unit 42 (step S61).

The abnormality occurrence site estimation unit 42 measures a vector field indicated by the one-dimensional intensity distribution, in which the gain is maximum, and the polarity is inverted, thereby estimating the abnormality occurrence site (step S62).

Thus, in the fourth embodiment, in a state in which the position of the inspection acoustic device of the sound inspection apparatus 100 with respect to the inspection target object a is not moved, the intensity vector in a wide range can be calculated at the same timing while shifting the position of the reference microphone concerning output of the reference signal.

Figure 17:
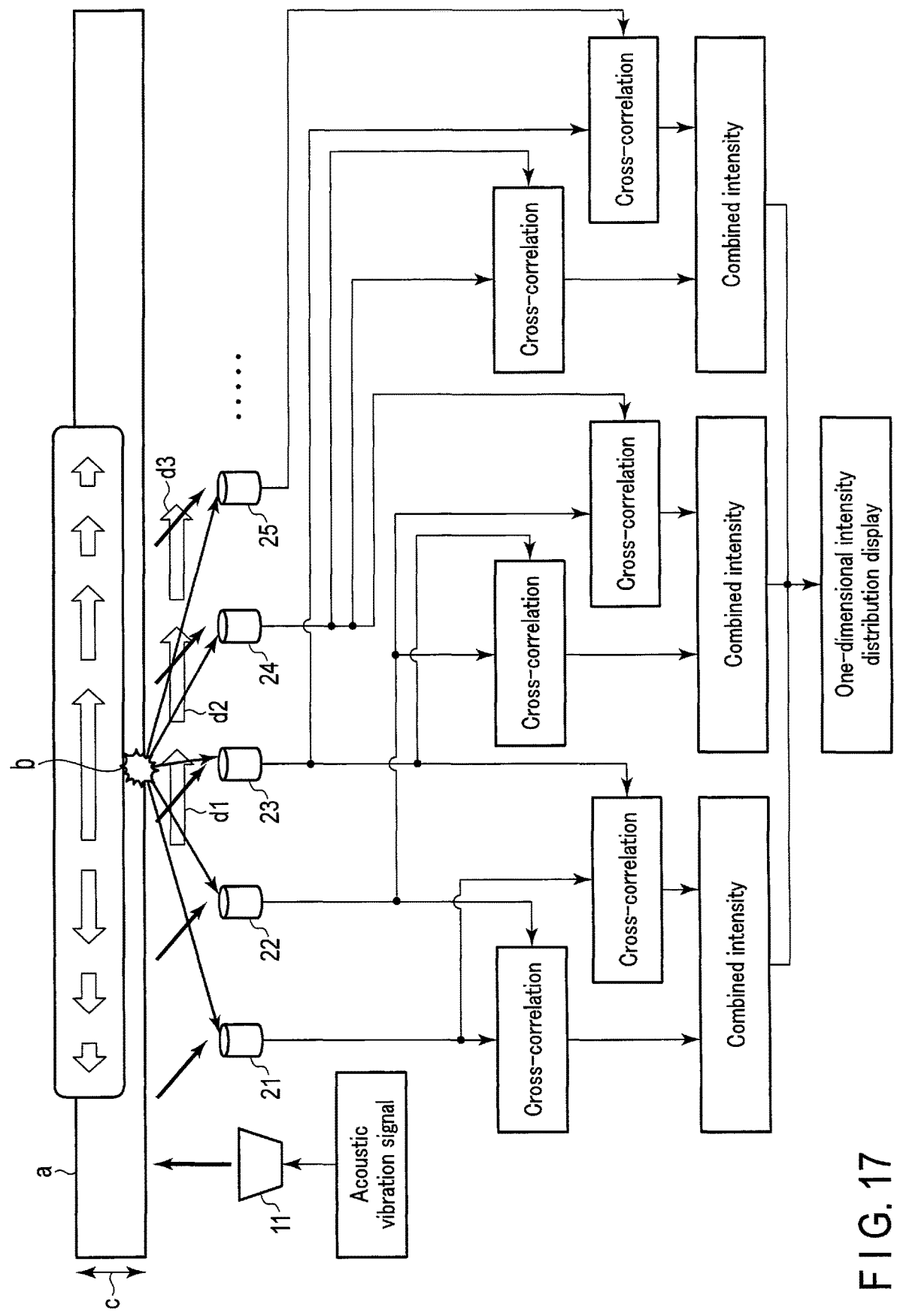
FIG. 17 is a view for explaining calculation of a combined intensity distribution.

FIG. 17 is a view for explaining calculation of the combined intensity distribution.

In the example shown in FIG. 17, viewed from the speaker 11, the microphones are arranged in the order of the first microphone 21, the second microphone 22, the third microphone 23, the fourth microphone 24, a fifth microphone 25 . . . .

In this example, a combined intensity that is an intensity vector (reference symbol d1 in FIG. 17) based on an intensity calculated by cross-correlation between the first microphone 21 and the second microphone 22 and an intensity calculated by cross-correlation between the first microphone 21 and the third microphone 23 in a case where the first microphone 21 is the reference microphone concerning output of the reference signal is calculated.

Also, in this example, a combined intensity that is an intensity vector (reference symbol d2 in FIG. 17) based on an intensity calculated by cross-correlation between the second microphone 22 and the third microphone 23 and an intensity calculated by cross-correlation between the second microphone 22 and the fourth microphone 24 in a case where the second microphone 22 is the reference microphone concerning output of the reference signal is calculated.

Furthermore, in this example, a combined intensity that is an intensity vector (reference symbol d3 in FIG. 17) based on an intensity calculated by cross-correlation between the third microphone 23 and the fourth microphone 24 and an intensity calculated by cross-correlation between the third microphone 23 and the fifth microphone 25 in a case where the third microphone 23 is the reference microphone concerning output of the reference signal is calculated.

Thus, even if the microphone group includes five or more microphones, the intensity vector in a wide range can be calculated at the same timing while shifting the position of the reference microphone concerning output of the reference signal.

Real-Time Processing

Processing of calculating the impulse response in real time will be described here. For example, there is known an inspection vehicle configured to inspect a road irradiating the road with a searching sound from a traveling vehicle and collecting acoustic information including a reflected sound by a microphone. In the technical field of this type, a technique capable of calculating an impulse response in real time is greatly demanded.

As processing for calculating an impulse response from two signal, adaptive filter processing and cross-correlation processing are known well. Of these, cross-correlation processing is advantageous for processing in real time.

FIG. 18 is a view for explaining real-time cross-correlation processing. For example, consider collecting an acoustic signal using two microphones. Acoustic signals sampled at each point of AD using a microphone of channel 1 (ch1) and a microphone of channel 2 (ch2) are arrayed in time series (n, n−1, . . . ) and stored in a memory (not shown). Positive correlation data between the channels based on a current time n as a reference is acquired from the data of the channels, and cross-correlation in time series is sequentially calculated. By this processing, a cross-correlation output that changes moment by moment along with the movement of the microphone can be obtained, and the impulse response between two signals can be calculated in real time.

Figure 19:
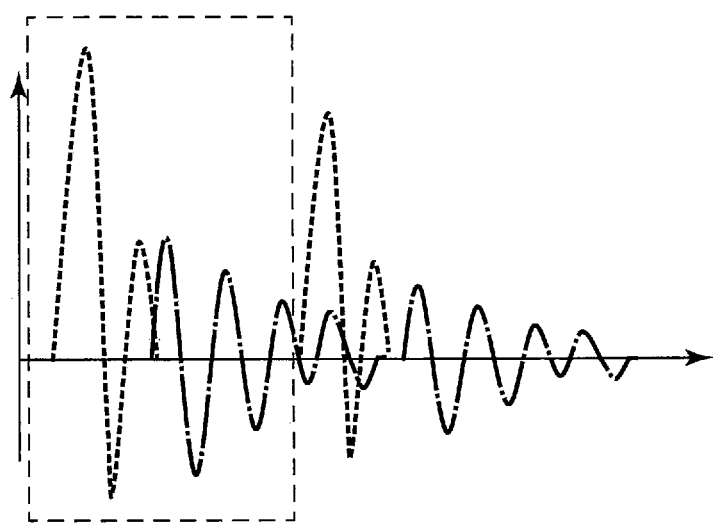
FIG. 19 is a waveform chart showing an example of an impulse response obtained in real time.

FIG. 19 is a waveform chart showing an example of the impulse response obtained in real time. The impulse response includes the waveform of a vibration sound indicated by a dotted line and the waveform of a vibration radiation sound indicated by a one-dot dashed line. Of these the waveform of the vibration sound includes a first peak and a second peak. The level of the first peak is the function of the interval between the microphone of channel 1 and the microphone of channel 2. The appearance position of the second peak is the function of the interval between the inspection target object and the reference microphone (for example, the microphone closer to the inspection target object: channel 1) from the starting point of the first peak.

In real-time processing, as indicated by the rectangular region of a dotted line in FIG. 19, the section from the starting point of the first peak to the starting point of the second peak is set to the processing target (detection window). Removal of an unnecessary component that is the first peak is applied to this section, as described in the embodiment, thereby performing frequency analysis. By this processing, processing of detecting the presence/absence of an abnormality by capturing a weak sound can be performed in real time.

Cross-correlation processing can also similarly be applied even in a state in which the system is stopped, as a matter of course. That is, according to this embodiment, it is possible to provide a sound inspection technique applicable to both batch processing and real-time processing by using cross-correlation processing.

Furthermore, real-time processing can be performed by applying cross-correlation processing not only to an impulse response obtained by two microphones but also to an impulse response obtained from information individually collected by a vibration sensor and a microphone. That is, the microphone and the vibration sensor can be regarded as a first sensor that outputs a first signal and a second sensor that outputs a second signal, respectively.

In the impulse response obtained by cross-correlation between the first signal and the second signal, the section from the starting point of the first peak to the starting point of the second peak is set to the processing target. The first peak is obtained based on the interval between the first sensor and the second sensor, and the starting point of the second peak is obtained based on a time width according to the interval between the inspection target object and the reference sensor. Frequency analysis is performed for an impulse response waveform obtained by removing the first peak, thereby implementing real-time nondestructive inspection independently of the type of sensor.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A sound inspection apparatus comprising:
 a vibration sound source configured to radiate a vibration sound from a speaker to an inspection target object;
 at least three microphones arranged at intervals in a direction along a surface of the inspection target object;
 a removing unit configured to, using some microphones of the at least three microphones as reference microphones, calculate an impulse response between a reference microphone and a first microphone different from the reference microphone based on a sound pressure of a radiation sound collected via the reference microphone and a sound pressure of a radiation sound collected via the first microphone, calculate an impulse response between the reference microphone and a second microphone different from the first microphone based on the sound pressure of the radiation sound collected via the reference microphone and a sound pressure of a radiation sound collected via the second microphone, and remove a component corresponding to the vibration sound from the calculated impulse response;
 an intensity calculation unit configured to calculate an intensity of the radiation sound based on the impulse response from which the vibration sound is removed; and an estimation unit configured to estimate, based on the calculated intensity, a site where an abnormality in the inspection target object has occurred.

2. The apparatus according to claim 1, wherein
the first microphone is arranged at an interval wider than the second microphone to the speaker, and
the reference microphone is arranged at an interval wider than the first microphone and the second microphone to the speaker.

3. The apparatus according to claim 2, wherein the intensity calculation unit includes:
an active intensity calculation unit configured to calculate an active intensity of the radiation sound based on the impulse response from which the vibration sound is removed;
a conversion processing unit configured to convert a phase concerning the impulse response from which the vibration sound is removed;
a reactive intensity calculation unit configured to calculate a reactive intensity of the radiation sound based on a conversion result by the conversion processing unit; and
a combined intensity calculation unit configured to calculate a combined intensity based on a direction of the active intensity calculated by the active intensity calculation unit and an amplitude of the reactive intensity calculated by the reactive intensity calculation unit, and
the estimation unit generates an intensity vector of the radiation sound based on the calculated combined intensity, and estimates a portion of the intensity vector, in which a magnitude is maximum, and the direction is reversed, as a site where the abnormality has occurred.

4. The apparatus according to claim 1, wherein
the reference microphone is arranged at an interval wider than the first microphone to the speaker, and
the second microphone is arranged at an interval wider than the reference microphone to the speaker.

5. The apparatus according to claim 4, wherein the intensity calculation unit includes:
an active intensity calculation unit configured to calculate an active intensity of the radiation sound based on the impulse response from which the vibration sound is removed;
a conversion processing unit configured to convert a phase concerning the impulse response from which the vibration sound is removed;
a reactive intensity calculation unit configured to calculate a reactive intensity of the radiation sound based on a conversion result by the conversion processing unit; and
a combined intensity calculation unit configured to calculate a combined intensity based on a direction of the active intensity calculated by the active intensity calculation unit and an amplitude of the reactive intensity calculated by the reactive intensity calculation unit, and
the estimation unit generates an intensity vector of the radiation sound based on the calculated combined intensity, and estimates a portion of the intensity vector, in which a magnitude is maximum, and the direction is reversed, as a site where the abnormality has occurred.

6. The apparatus according to claim 1, wherein the intensity calculation unit includes:
an active intensity calculation unit configured to calculate an active intensity of the radiation sound based on the impulse response from which the vibration sound is removed;
a conversion processing unit configured to convert a phase concerning the impulse response from which the vibration sound is removed;
a reactive intensity calculation unit configured to calculate a reactive intensity of the radiation sound based on a conversion result by the conversion processing unit; and
a combined intensity calculation unit configured to calculate a combined intensity based on a direction of the active intensity calculated by the active intensity calculation unit and an amplitude of the reactive intensity calculated by the reactive intensity calculation unit, and
the estimation unit generates an intensity vector of the radiation sound based on the calculated combined intensity, and estimates a portion of the intensity vector, in which a magnitude is maximum, and the direction is reversed, as a site where the abnormality has occurred.

7. A sound inspection apparatus comprising:
a vibration sound source configured to radiate a vibration sound from a speaker to an inspection target object;
at least four microphones arranged at intervals in a direction along a surface of the inspection target object, the microphones including a first microphone adjacent to the speaker, a second microphone arranged at an interval wider than the first microphone to the speaker, a third microphone arranged at an interval wider than the second microphone to the speaker, and a fourth microphone arranged at an interval wider than the third microphone to the speaker;
a removing unit configured to calculate an impulse response between the first microphone and the second microphone based on a sound pressure of a radiation sound collected via the first microphone and a sound pressure of a radiation sound collected via the second microphone, calculate an impulse response between the first microphone and the third microphone based on the sound pressure of the radiation sound collected via the first microphone and a sound pressure of a radiation sound collected via the third microphone, and remove a component corresponding to the vibration sound from the calculated impulse response between the first microphone and the third microphone, and further calculate an impulse response between the second microphone and the third microphone based on the sound pressure of the radiation sound collected via the second microphone and the sound pressure of the radiation sound collected via the third microphone, calculate an impulse response between the second microphone and the fourth microphone based on the sound pressure of the radiation sound collected via the second microphone and a sound pressure of a radiation sound collected via the fourth microphone, and remove a component corresponding to the vibration sound from the calculated impulse response between the second microphone and the fourth microphone;
an intensity calculation unit configured to calculate an intensity of the radiation sound based on the impulse response from which the vibration sound is removed; and
an estimation unit configured to estimate, based on the calculated intensity, a site where an abnormality in the inspection target object has occurred.

8. The apparatus according to claim 7, wherein the intensity calculation unit includes:

an active intensity calculation unit configured to calculate an active intensity of the radiation sound based on the impulse response from which the vibration sound is removed;
a conversion processing unit configured to convert a phase concerning the impulse response from which the vibration sound is removed;
a reactive intensity calculation unit configured to calculate a reactive intensity of the radiation sound based on a conversion result by the conversion processing unit; and
a combined intensity calculation unit configured to calculate a combined intensity based on a direction of the active intensity calculated by the active intensity calculation unit and an amplitude of the reactive intensity calculated by the reactive intensity calculation unit, and
the estimation unit generates an intensity vector of the radiation sound based on the calculated combined intensity, and estimates a portion of the intensity vector, in which a magnitude is maximum, and the direction is reversed, as a site where the abnormality has occurred.

9. A method applied to a sound inspection apparatus including a vibration sound source configured to radiate a vibration sound from a speaker to an inspection target object, and at least three microphones arranged at intervals in a direction along a surface of the inspection target object, the method comprising:
using some microphones of the at least three microphones as reference microphones, calculating an impulse response between a reference microphone and a first microphone different from the reference microphone based on a sound pressure of a radiation sound collected via the reference microphone and a sound pressure of a radiation sound collected via the first microphone, calculating an impulse response between the reference microphone and a second microphone different from the first microphone based on the sound pressure of the radiation sound collected via the reference microphone and a sound pressure of a radiation sound collected via the second microphone, and removing a component corresponding to the vibration sound from the calculated impulse response;
calculating an intensity of the radiation sound based on the impulse response from which the vibration sound is removed; and
estimating, based on the calculated intensity, a site where an abnormality in the inspection target object has occurred.

10. The method according to claim 9, wherein
the first microphone is arranged at an interval wider than the second microphone to the speaker, and
the reference microphone is arranged at an interval wider than the first microphone and the second microphone to the speaker.

11. The method according to claim 10, wherein the method further comprising:
calculating an active intensity of the radiation sound based on the impulse response from which the vibration sound is removed;
converting a phase concerning the impulse response from which the vibration sound is removed;
calculating a reactive intensity of the radiation sound based on a conversion result of the phase; and
calculating a combined intensity based on a direction of the calculated active intensity and an amplitude of the calculated reactive intensity, and generating an intensity vector of the radiation sound based on the calculated combined intensity, and
estimating a portion of the intensity vector, in which a magnitude is maximum, and the direction is reversed, as site where the abnormality has occurred.

12. The method according to claim 9, wherein
the reference microphone is arranged at an interval wider than the first microphone to the speaker, and
the second microphone is arranged at an interval wider than the reference microphone to the speaker.

13. The method according to claim 12, wherein the method further comprising:
calculating an active intensity of the radiation sound based on the impulse response from which the vibration sound is removed;
converting a phase concerning the impulse response from which the vibration sound is removed;
calculating a reactive intensity of the radiation sound based on a conversion result of the phase; and
calculating a combined intensity based on a direction of the calculated active intensity and an amplitude of the calculated reactive intensity, and
generating an intensity vector of the radiation sound based on the calculated combined intensity, and
estimating a portion of the intensity vector, in which a magnitude is maximum, and the direction is reversed, as a site where the abnormality has occurred.

14. The method according to claim 9, wherein the method further comprising:
calculating an active intensity of the radiation sound based on the impulse response from which the vibration sound is removed;
converting a phase concerning the impulse response from which the vibration sound is removed;
calculating a reactive intensity of the radiation sound based on a conversion result of the phase; and
calculating a combined intensity based on a direction of the calculated active intensity and an amplitude of the calculated reactive intensity, and
generating an intensity vector of the radiation sound based on the calculated combined intensity, and
estimating a portion of the intensity vector, in which a magnitude is maximum, and the direction is reversed, as site where the abnormality has occurred.

15. A method applied to a sound inspection apparatus including a vibration sound source configured to radiate a vibration sound from a speaker to an inspection target object, and at least four microphones arranged at intervals in a direction along a surface of the inspection target object, the microphones including a first microphone adjacent to the speaker, a second microphone arranged at an interval wider than the first microphone to the speaker, a third microphone arranged at an interval wider than the second microphone to the speaker, and a fourth microphone arranged at an interval wider than the third microphone to the speaker, the method comprising:
calculating an impulse response between the first microphone and the second microphone based on a sound pressure of a radiation sound collected via the first microphone and a sound pressure of a radiation sound collected via the second microphone, calculating an impulse response between the first microphone and the third microphone based on the sound pressure of the radiation sound collected via the first microphone and a sound pressure of a radiation sound collected via the third microphone, and removing a component corresponding to the vibration sound from the calculated impulse response between the first microphone and the third microphone, and further calculating an impulse response between the second microphone and the third microphone based on the sound pressure of the radiation sound collected via the second microphone and the sound pressure of the radiation sound collected via the third microphone, calculating an impulse response between the second microphone and the fourth microphone based on the sound pressure of the radiation sound collected via the second microphone and a sound pressure of a radiation sound collected via the fourth microphone, and removing a component corresponding to the vibration sound from the calculated impulse response between the second microphone and the fourth microphone;

calculating an intensity of the radiation sound based on the impulse response from which the vibration sound is removed; and estimating, based on the calculated intensity, a site where an abnormality in the inspection target object has occurred.

16. The method according to claim 15, wherein the method further comprising:

calculating an active intensity of the radiation sound based on the impulse response from which the vibration sound is removed;

converting a phase concerning the impulse response from which the vibration sound is removed;

calculating a reactive intensity of the radiation sound based on a conversion result of the phase; and calculating a combined intensity based on a direction of the calculated active intensity and an amplitude of the calculated reactive intensity, and generating an intensity vector of the radiation sound based on the calculated combined intensity, and estimating a portion of the intensity vector, in which a magnitude is maximum, and the direction is reversed, as a site where the abnormality has occurred.

* * * * *